United States Patent
Hudak et al.

(10) Patent No.: US 9,963,289 B2
(45) Date of Patent: May 8, 2018

(54) OUTDOOR PROTECTIVE HOUSING FOR STORING AND CONNECTING A PORTABLE GENERATOR

(71) Applicant: Kohler Co., Kohler, WI (US)

(72) Inventors: Eric B. Hudak, Sheboygan Falls, WI (US); Manuel Rumao, Sheboygan, WI (US); Travis Andren, Philadelphia, PA (US); Steve Oxtoby, Howards Grove, WI (US); Billy Brandenburg, Kohler, WI (US)

(73) Assignee: Kohler Co., Kohler, WI (US)

( * ) Notice: Subject to any disclaimer, the term of this patent is extended or adjusted under 35 U.S.C. 154(b) by 362 days.

(21) Appl. No.: 15/010,481

(22) Filed: Jan. 29, 2016

(65) Prior Publication Data

US 2016/0226413 A1    Aug. 4, 2016

Related U.S. Application Data

(60) Provisional application No. 62/111,435, filed on Feb. 3, 2015.

(51) Int. Cl.
| | |
|---|---|
| *H01R 13/46* | (2006.01) |
| *H05K 5/00* | (2006.01) |
| *B65D 85/68* | (2006.01) |
| *H02J 7/35* | (2006.01) |
| *H02K 5/10* | (2006.01) |
| *F02N 11/08* | (2006.01) |

(52) U.S. Cl.
CPC ............... *B65D 85/68* (2013.01); *H02J 7/35* (2013.01); *H02K 5/10* (2013.01); *F02N 11/0803* (2013.01)

(58) Field of Classification Search
CPC ... B65D 85/68; H02J 7/35; H02K 5/10; F02N 11/0803; H02P 9/0096
USPC ................................................... 174/50, 520
See application file for complete search history.

(56) References Cited

U.S. PATENT DOCUMENTS

| | | | |
|---|---|---|---|
| 3,714,449 A | 1/1973 | De Bella | |
| 4,698,975 A | 10/1987 | Tsukamoto et al. | |
| 5,642,702 A * | 7/1997 | Kouchi | F02B 63/04 123/198 E |
| 5,731,687 A * | 3/1998 | Hirano | F02B 63/04 123/198 E |
| 6,184,461 B1 * | 2/2001 | Flegel | H01R 13/72 174/135 |
| 2010/0060015 A1 * | 3/2010 | Buker | F02B 63/04 290/1 R |
| 2011/0095540 A1 * | 4/2011 | Jackson | F02B 63/04 290/1 A |

* cited by examiner

Primary Examiner — Sherman Ng
(74) Attorney, Agent, or Firm — Lempia Summerfield Katz LLC (57) ABSTRACT

A portable generator housing is operable to house a generator. An enclosure of the portable generator housing includes a bottom, a top, and a movable side. The movable side may be removably connected with the top. The movable side is configured to move between a first position where a top edge of the movable side is adjacent to the top and a second position where the top edge of the movable side is in communication with a ground adjacent to the bottom.

20 Claims, 9 Drawing Sheets

OUTDOOR PROTECTIVE HOUSING FOR STORING AND CONNECTING A PORTABLE GENERATOR

CROSS-REFERENCE TO RELATED APPLICATIONS

This application claims priority benefit of U.S. Provisional Application Ser. No. 62/111,435, filed Feb. 3, 2015, which is hereby incorporated by reference in its entirety.

TECHNICAL FIELD

This disclosure generally relates to housings for power systems, and more particularly relates to a housing for storing a portable generator and providing fuel and electrical connections to a building near the housing.

BACKGROUND OF THE INVENTION

Portable generators are often designed to provide easy, fast, transportable power at a variety of locations, such as construction sites, tailgates, and campgrounds. In some instances, such as during power failures or when additional power is needed to supplement utility power, portable generators may provide power to residential buildings or any other type of building or structure. It is important to ensure that the storage of portable generators is secure, as storing or leaving a portable generator outdoors may expose the portable generator to harmful elements or provide too high of a risk of theft. However, storing a portable generator in a garage or shed may not be optimal, as the stored portable generator may take up otherwise useful storage space and may not be easily accessible or serviceable, especially at night or in an emergency.

DETAILED DESCRIPTION OF THE EMBODIMENTS

For the safe and useful outdoor storage of a portable generator, a variety of housings, such as protective cases, enclosures, garages, docking stations, or hoods (referred to as "housings" or "housing systems") may be used, providing convenient, aesthetically-pleasing, and/or water-proof or weather-proof protection. In some systems, protective housings may additionally include convenient features, such as assisted entry, noise-reducing structures, quick connections for power and/or fuel lines, exhaust filtering, and lighting for servicing the generator. Some housing systems may include control panels disposed on the housing itself that may communicate with the portable generator or its control panel in order to control its operation. Protective housings may be permanently or semi-permanently affixed outdoors and fitted with additional power-generating or power-storing devices, such as solar panels or wind turbines, which may provide additional power to supplement the portable generator power or perform auxiliary charging of the portable generator battery or a battery of a service light, for example. Some protective housings may additionally include safety features to prevent accidental or unauthorized entry of persons or animals into the housing. Additionally, the protective housings may be equipped with an easy escape mechanism to prevent confinement of small children or animals when the case is not occupied by the portable generator.

Figure 1:
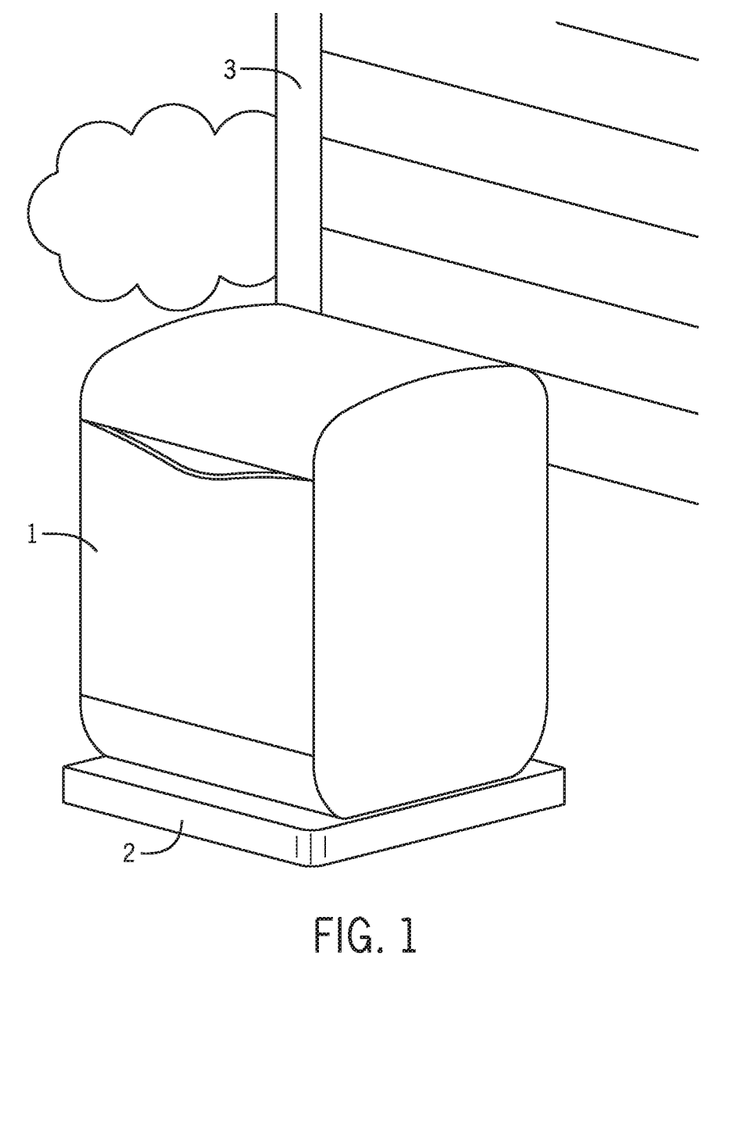
FIG. 1 shows an example of an outdoor protective portable generator housing installed outside a house.

FIG. 1 shows an example of a housing 1 which may store a portable generator 4 (see, for example, FIG. 5). The housing 1 may be positioned and/or mounted next to a residential house or building 3, which may provide convenient storage of the portable generator 4 for the building owner and/or free-up space in the garage or shed that would otherwise be taken up by the portable generator 4 if the housing 1 were not used. Alternatively, the residential house or building 3 may be any type of building or other structure. The housing 1 may alternatively be positioned and/or mounted at various other locations. For example, the housing 1 may be positioned and/or mounted at the corner of a residential lot, near an agricultural or farm building, or near a machine or tower requiring power, such as a cellular tower.

The housing 1 may be placed directly on the ground or atop material placed on the ground, such as rocks or woodchips. The housing 1 may be anchored to the ground, such as with ground stakes or metal anchor bolts.

Figure 2:
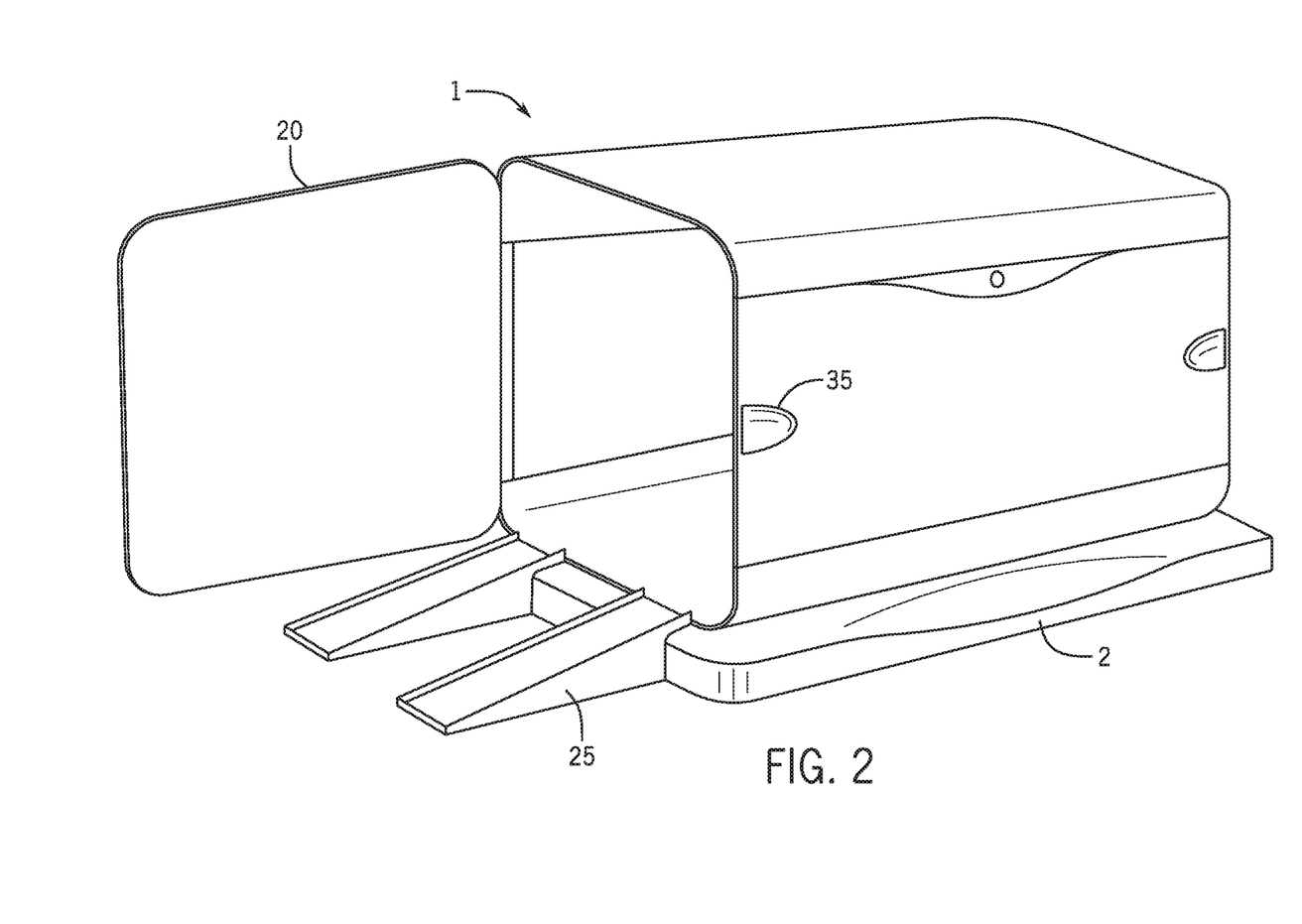
FIG. 2 shows an example of an outdoor protective portable generator housing mounted to a slab.

Alternatively, the housing 1 may be mounted to a support slab or platform 2. The housing 1 may be mounted to the slab 2 with bolts, stakes, locking tabs or other like connectors integrally formed in the housing 1 and/or slab 2, and/or using various other connectors or combinations. The support slab 2 may anchor the housing 1, providing further weather-resistance to strong winds and may prevent theft or tampering. The support slab 2 may be or include poured concrete, hard plastic, metal, stone, rubber, or any other material that may support the weight of the portable generator 4 and its housing 1 and withstand the elements. The slab 2 may be made of a heavy material which may further act as an anchor for the portable generator housing 1. In some systems, the characteristics of the slab 2 (such as its weight and size) may sufficiently anchor the slab 2 and housing 1 to the ground. In other systems, the slab 2 itself may be anchored to the ground, such as with ground stakes or anchor bolts.

Figure 3:
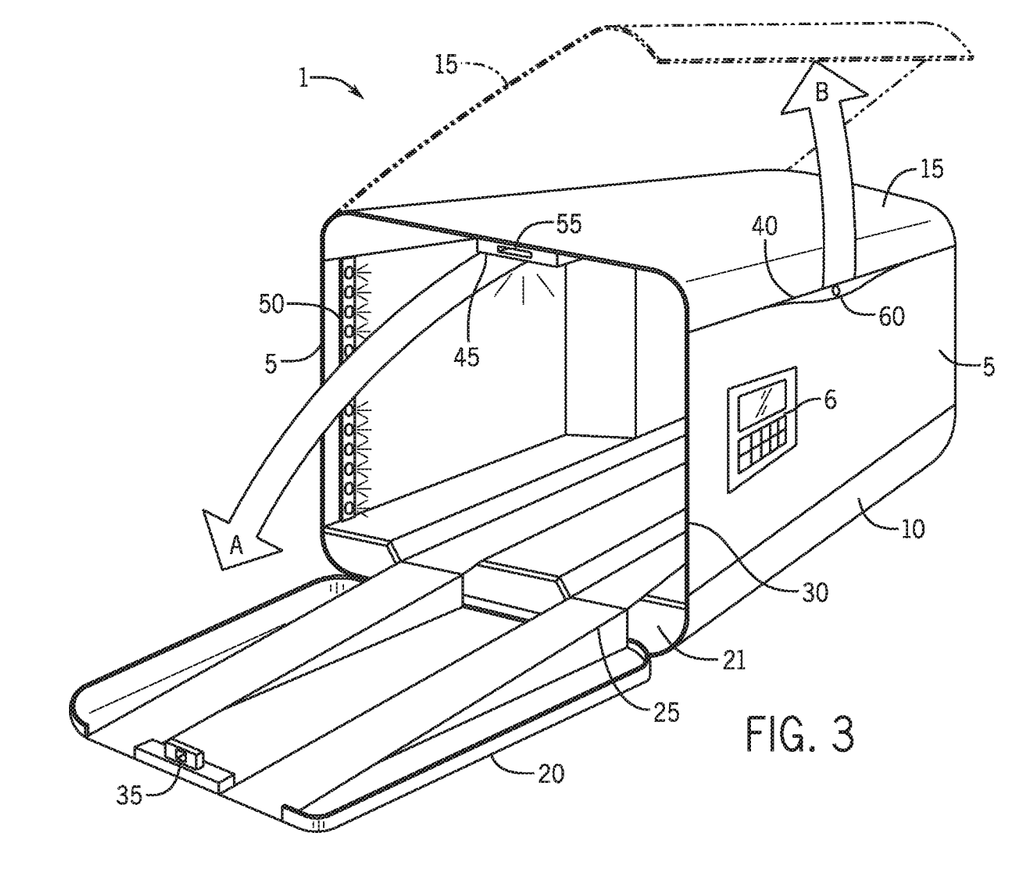
FIG. 3 shows an example of an opened outdoor protective housing for a portable generator.

FIGS. 2 and 3 show examples of an opened housing 1. The housing 1 may include sides 5, 20, a top 15, and a bottom 10. In some systems, the housing 1 may include four sides, with two long sides 5 positioned generally parallel to each other and two short sides 20 positioned generally parallel to each other. The sides 5, 20, top 15, and bottom 10 may all fit together to form a generally box-like shape when viewed from the outside. In other systems, the housing 1 may have any other number of sides 5, 20. Additionally, in other systems, the sides 5, 20 of the housing 1 may be positioned in other configurations and forming other shapes.

The sides 5, 20 may be generally flat, flat with rounded edges or corners, bent, chamfered, rounded, or various combinations.

The sides 5, 20, top 15, and bottom 10 may be made of material that is substantially weatherproof for placement outdoors, including but not limited to plastic, metal, or rubber. The sides 5, 20, top 15, and bottom 10 may also include layers of materials or be formed with an air gap or pocket. Between or adjacent to a surface of the material layers that may make up the sides 5, 20, top 15, and bottom 10, there may be disposed noise-reducing or sound-dampening material 21 that may lower the operating sounds of the portable generator 4 when operating inside the housing 1. The sound-dampening material 21 may be air, foam, insulation, or any other material which may reduce noise. This padding or insulating material 21 may be sufficiently heat and fire resistant to allow for the safe operation of the portable generator 4 in the housing 1.

The configuration of the sides 5, 20 of the housing 1 may be modular or customizable depending on the model of portable generator 4 to be placed therein. For example, the sides 5, 20, top 15, and bottom 10 of the housing 1 may be sized or laid out such that a particular model of portable generator 4 fits and/or resides directly adjacent to, or within a certain distance (such as 2 or 4 inches) from, one or more of the sides 5, 20, top 15, and/or bottom 10.

In other systems, the housing 1 may be configured to enclose a variety of portable generator models and include flexible or adjustable features (such as a secondary muffler 70 or interchangeable side panels) that may facilitate connection with many different portable generator models. For example, the housing 1 may include a common frame which may be large enough to fit a variety of portable generator models within the frame. Different sized or shaped sides 5, 20 (which may be manufactured to correspond or mate with different portable generator sizes and models) may be connected with the common frame. As such, a common housing frame may be used by two different users with different portable generator sizes or models, with each housing 1 having specifically sized sides 5, 20 to provide a customized housing 1 for their particular portable generator 4. In other systems, the frame itself may be adjustable to allow it to expand or contract for different portable generator sizes and models.

In still other systems, the housing 1 may be configured to receive one or more insertable, space-consuming panels. These space-consuming panels may connect with a frame, one or more of the sides 5, 20, the top 15, the bottom 10, or any combination thereof. The space-consuming panels may be used to adapt a housing 1 that is capable of receiving larger sized portable generators for receipt, storage, and optimal usage of a smaller portable generator 4.

Sound dampening material 21 may be attached or added to the outer face of these space-consuming panels which may compensate for the spatial difference between the larger shell formed by the bare sides 5, 20, top 15, and bottom 10 alone (without the internal panels) and the portable generator unit 4 the user wishes to place inside the housing 1. The configuration of the sides 5, 20 of the housing 1 may be modular or customizable depending on the model of portable generator 4 to be placed therein.

The sides 5, 20, top 15, and bottom 10 may be connected to each other and/or other components at their junctions by welding, tongue-in-groove connections, screws, bolts, snap connections, hinges, releasable latches, brackets, or any other connection that may hold the sides 5, 20, top 15, bottom 10, and/or housing 1 together. Additional weatherproofing features (such as rubber edges or a weather-proof sealant) may be added to the sides 5, 20, top 15, bottom 10 and/or housing to provide a weather-proof or more air-tight interaction.

The bottom 10 may include grooves or other indentations 30 in its internal/upper face shaped to guide wheels of the portable generator 4 when being placed in or removed from the housing 1. Within these grooves 30 or independent of the grooves 30, wheel stops may be formed within the upper face of the bottom 10 which may indicate to the user sliding in the portable generator 4 that the portable generator 4 has reached the target placement area. Wheel stops may, for example, be a divot or deeper indentation in the bottom 10, from which the portable generator 4 may not be easily moved without applying a further pulling or pushing force and which may indicate that the portable generator 4 has reached its optimal position. Alternatively, the wheel stops may be one or more solid rubber stopper or impeding components designed to interact with one or more components of the portable generator 4 (such as the wheels or a frame) and stop forward movement of the portable generator 4. Other wheel stops are possible.

Up to all of the sides 5, 20 of the housing 1 may be removable or foldable, such as hinged at a corner junction with another side 5, 20, the top 15, or the bottom 10 of the housing 1. This may provide an easy entrance or exit for the portable generator 4 at whichever angle is most convenient to the user.

In some systems, additional ramps 25 may be folded up within the housing 1 or permanently or semi-permanently positioned outside of the housing 1, such that a portable generator 4 may be rolled up the ramp 25 when the housing 1 is opened. The ramps 25 may be made of any suitable material (such as any metal, composite plastic, wood, or other material) that is resistant to weather elements and/or capable of supporting a portable generator 4. The ramps 25 may include grooves which may support the wheels of a portable generator 4 as the portable generator 4 is pushed into the housing 1.

Alternatively, any or all of the sides 5, 20 may integrally include one or more ramps 25 formed into the side 5, 20. The ramps 25 may be projections out of the side 5, 20, grooves within the side 5, 20, or some variation. The ramps 25 may be formed on any surface of sides 5, 20 facing outward from the housing 1 and/or any surface of the sides 5, 20 facing toward the internal cavity of the housing 1. The ramps 25 may make insertion and/or removal of the portable generator 4 from the housing 1 easier.

The ramps 25 of the side 5, 20 may align with wheel grooves 30 of the bottom 10. When side 5 is folded down (at a hinge connected to the bottom 10 so to move in the direction of arrow A) or removed and placed on the ground next to the entrance to the housing 1, the removed or folded side 5, 20 may provide a ramp 25 for wheeling a portable generator 4 into the housing 1. These ramps 25 and/or grooves 30 may be matched to a particular portable generator model or be adjustable to many different models.

Any of the sides 5, 20, top 15, and bottom 10 may include a side latch 35 for releasably connecting a side 5, 20 to the top 15 or bottom 10. For example, the side latch 35 may be positioned to allow a side 5 to rotate generally horizontally (parallel with the ground) and latch with side 20. In another example, the side latch 35 may be positioned to allow a side 5 to rotate generally vertically (either down toward the ground or up away from the ground) and latch with top 15. The side latch 35 may be lockable and/or may include sensors discussed below.

Any of the sides 5, 20 and top 15 may include a lid latch 40 for releasably connecting the top 15 to one or more of the sides 5, 20. The lid latch 40 may be lockable or include sensors discussed below. The top 15 may be a lid that opens at the lid latch 40 generally following the direction of arrow B due to a hinge between the top 15 and the side 5, 20 opposite the lid latch 40. The top 15 operating as a lid may provide easy access to the inside of the housing 1, such as for inspecting the portable generator 4 therein.

The housing 1 may include internal or external lighting that may make it easier to access the housing 1 or portable generator 4 at night and/or in storm conditions. The lighting may include light emitting diodes (LEDs) or any other lighting technology, particularly one that may last for long periods of time without needing to be replaced and that uses little energy. The lighting may be powered by batteries, a power connection to the housing 1 from a utility source connected to the house, power from the portable generator 4, or power from other sources or combinations of sources. Either or both internal and external lights may be programmable by a control panel 6 disposed on the portable generator housing 1.

The control panel 6 may communicate with a power generation component of the portable generator 4. The control panel 6 may additionally communicate with a primary power source and/or a transfer switch. The control panel 6 may include hardware, software, firmware, or a combination. The control panel 6 may include or access logic or instructions stored in a computer readable medium. The control panel 6 may include a processor or processing component that may execute the logic or instructions stored in the computer readable medium.

The external lighting may be on all of the time to provide aesthetic or safety lighting for the owner's patio or yard. Alternatively, the external lighting may be equipped with (or controlled based on) a motion sensor or detector such that the light is only activated when motion is sensed for security and convenience. As another example, the external lighting may be equipped with (or controlled based on) a light sensor or detector such that the light is only activated when it gets dark outside. As another alternative, the external lighting may be equipped with (or controlled based on) a clock or timer, and programmed to operate during specific times (such as at night).

The internal lighting may be integrated with (or controlled based on) a sensor (pressure, light, motion, or otherwise) that may cause the light to turn on whenever the sensor detects that the housing 1 has been opened. The housing 1 may include internal lighting, such as side lights 50 which may be disposed along the sides 5, 20 adjacent to the opened side 5, 20 forming the entrance. The side lights 50 may be a row of small LEDs or light rope that may illuminate the entryway or ramp 25 of the housing 1 making it easier for the user to replace or remove the portable generator 4. The side lights 50 may be triggered by an open sensor 55 which may be disposed on or with the side latch 35. The housing 1 may include a lid light 45 disposed on the lower face of the top 15. The lid light 45 may be triggered by an open sensor 55 and/or a lid open sensor 60, which may be disposed on or with the lid latch 40. The open sensor 55 and lid open sensor 60 may be any type of sensor that may detect when any side 5, 20, top 15, side latch 35, and/or lid latch 40 has been opened or unlocked. Other variations are possible.

Safety or security features may add additional layers of protection for an owner, which may indicate when an unauthorized human or animal has opened the housing 1 or entered its internal cavity. Open sensors, such as the open sensor 55 and the lid open sensor 60, may indicate the open condition to a safety or security system controller, user device, monitoring server, and/or to a generator controller. When the safety or security system controller, user device, monitoring server, and/or generator controller receives the indication of an open condition, the receiving system, device, server, or controller may send a signal, message, or indication of the open condition to the owner. The signal, message, or indication may include an audio and/or visual alert (e.g., the external lights flashing and/or beeping sound) on the housing 1 itself, a remote warning such as a text, email, app notification, and/or any other communication. Remote warnings may be sent through communication lines to the house 3 and/or a home security system. A remote warning may include a wireless signal sent to any suitable receiver, such as the owner's cell phone. Many variations are possible.

The housing 1 may include infrared or heat sensors (or any other like sensor) to detect when a human or animal is inside the housing 1, and/or to sense the infrared or heat conditions of the portable generator 4 when operating. For example, when an infrared sensor detects the presence of a human or animal, the sensor may communicate with a safety or security system, user device, monitoring server, and/or generator controller, any of which may control the operation of the portable generator 4 and/or trigger an automatic shutoff of the portable generator 4 (such as by shutting off a fuel supply line or sending an engine-kill signal to the engine). As another example, when the sensors detect that the housing 1 has been opened and/or that the heat signature is too high during operation, the safety system controller may trigger an automatic shutoff of the operation of the portable generator 4. These safety and security systems may be programmable by the user or pre-programmed for the user. Additionally or alternatively to the sensors of the safety systems, a safety lever or pull handle may be positioned inside the housing 1 that may unlock the housing 1 from the inside even when locked from the outside, allowing the housing 1 to be manually opened from the inside.

The safety lever or pull handle may be a safety member positioned inside the enclosure. The sides of the includes a locked side that is lockable from the outside, and the safety member is configured to allow for opening or removal of the locked side when engaged from within the enclosure.

Figure 4:
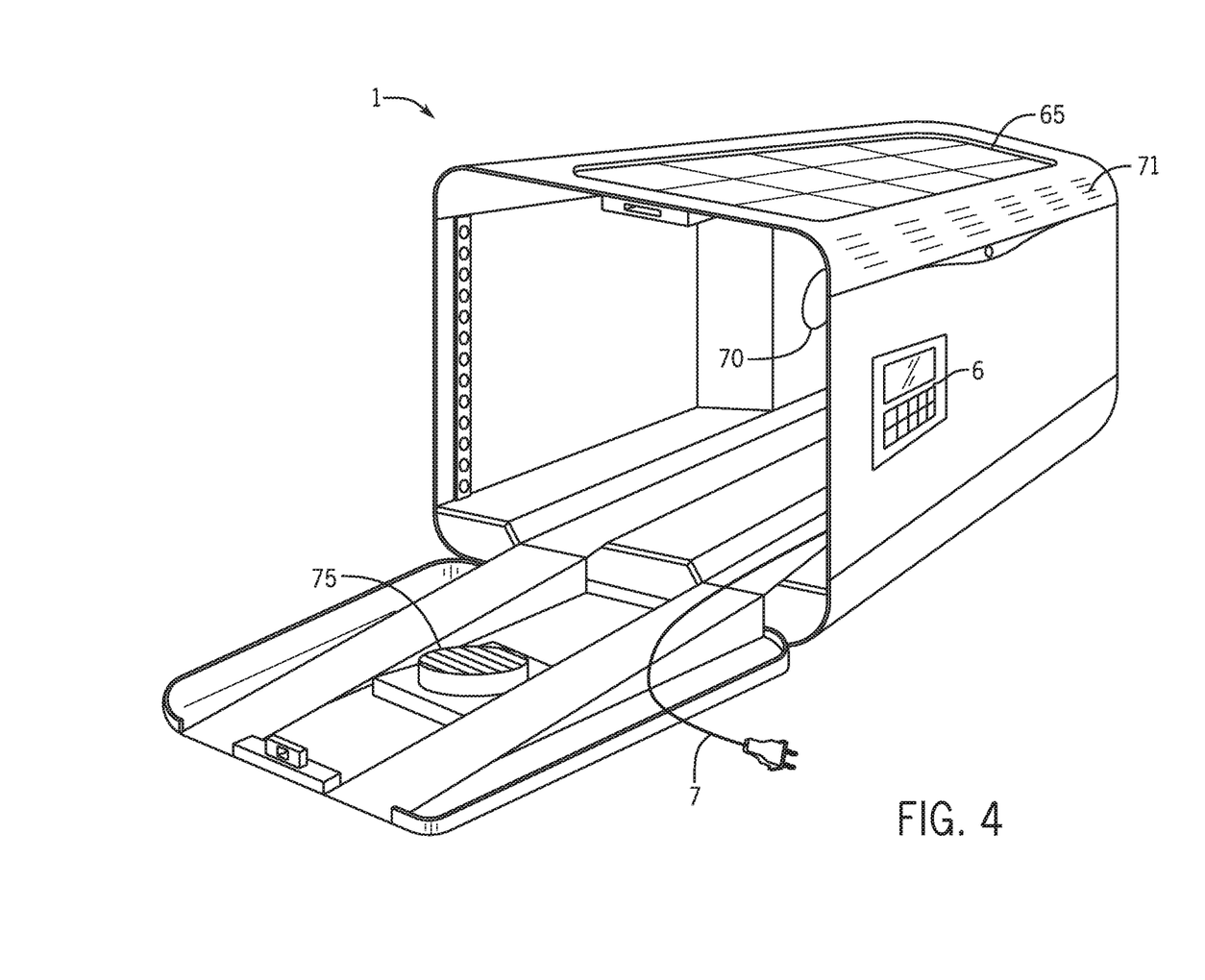
FIG. 4 shows another example of an opened outdoor protective housing for a portable generator.

FIG. 4 shows another example of an opened outdoor portable generator housing 1. The housing 1 may include some or all of the features previously described. The housing 1 may include auxiliary power devices, such as a solar panel 65, and/or any other features for optimizing the operation of a portable generator 4 inside the housing 1, such as a secondary muffler 70, air vents 71, and cool air intake channel 75 (discussed more below).

The top 15 of the housing 1 may include one or more solar panels 65 that may collect the solar radiation that hits the housing 1 when positioned outdoors. This collected solar energy may be used to supplement portable generator power and/or charge a battery of the portable generator 4 itself when electrically connected to the housing 1. The solar panel 65 may additionally be used to charge any battery disposed on the housing 1, such as batteries for internal or external lighting, for safety or security system controllers and/or sensors built-in to the housing 1, and/or a control panel 6 on the housing 1, for controlling any operation of the portable generator 4 inside and/or its features. Alternatively, the housing 1 may be connected to a wind turbine that may collect available outdoor wind energy and convert it for similar uses.

The housing 1 may include a secondary muffler 70 that may connect to the exhaust output after the muffler 81 on a portable generator 4. The secondary muffler 70 may further muffle noise generated by the operation of the portable generator 4 which was not muffled by the muffler 81. The secondary muffler 70 may be a stock muffler or a custom-made muffler. The secondary muffler 70 may include stainless steel wool or carbon steel wool, or any other material appropriate to muffle noise and withstand exhaust temperatures.

The housing 1 may include air vents 71 that may allow heat created by the portable generator 4 during operation to escape the housing 1 to the atmosphere. In some systems, the air vents 71 may be located in the top 15 of the housing 1 and may allow rising heat to escape the housing 1, thereby maintaining the inside of the housing 1 and the portable generator 4 at safe operating temperatures. The air vents 71 may alternatively be positioned in other locations on the housing 1, such as near components which may get hot during operation. The air vents 71 of the housing 1 may include one or more openings, such as holes or slots, in the sides 5, 20, top 15, and/or bottom 10. These openings may be louvered (or similarly structured) so that the air vents 71 may prevent rain or other elements from entering the housing 1 and maintain its weatherproof quality. The openings may be adjustable (such as from an open to a closed position, in opening size, or in cover position over the opening). A control panel 6, generator controller, or user device may be capable of controlling the parameters of adjustable openings. In some instances, the opening parameters may be programmed and controlled automatically, such as to close when inclement weather is detected and the portable generator 4 is not in use. Other variations are possible.

The housing 1 may include a control panel 6 which may be integrated into the housing 1 and accessible by a user when the housing 1 is closed. The control panel 6 may control any one or more aspects of a connected portable generator 4, the housing 1, the fuel supply, power transmitted to or from the housing 1, and loads connected to the portable generator 4 or adjacent building, or various other components or functions.

The control panel 6 may include a display with a keypad. The display may be lighted. The control panel 6 may be similar to control panels 6 that are disposed on portable generators 4, or may be different.

The control panel 6 may be positioned on the top 15 or any of the sides 5, 20 of the housing 1. Alternatively, the control panel 6 (or additional control panels 6) may be positioned on a separate unit positioned near the housing 1, such as on a post in the ground next to the housing 1 or attached to the side of a building or other structure 3 near the housing 1. The control panel 6 (or additional control panels 6) may also be positioned remotely from the housing 1, such as inside the user's house 3 or portable. The housing 1 may receive wireless signals from the remote control panel 6 by way of a receiver on the housing 1. In other examples, remote control panels 6 may communicate wirelessly with the control panel 6 positioned with the housing 1. The remote control panel 6 may direct functions of the housing 1 and/or the portable generator 4 connected to the housing 1.

The control panel 6 or its receiver on the housing 1 may be connected to a portable generator 4 which may provide a channel for communication or power. This connection may be in the form of cables 7 positioned inside the housing 1 that connect to plugs located on the portable generator 4. The communication connection from the control panel 6 to the portable generator 4 may also be a wireless connection, such as over a local wireless network, Bluetooth, or other radio frequency (RF) communication. The connection through the cable 7 from the portable generator 4 to the housing 1 may allow power generated by the portable generator 4 to be transmitted to any load the user chooses to connect to housing 1. The connection of cable 7 may also allow the portable generator 4 to power any components of the housing 1 itself, such as the control panel 6, lighting, or security/safety system.

The one or more cable connections 7 within the housing 1 may be connected to the plugs located on the portable generator 4 by the user before positioning the portable generator 4 into the housing 1 and closing it. This may be advantageous because a user may then control the operation of the portable generator 4, gain information about its status, and/or charge the portable generator battery, all while the portable generator 4 is safely and securely locked away inside its housing 1. These features may allow the portable generator 4 to operate in its housing 1 similarly to a stand-by generator system, with the added advantage of allowing the user to take his power anywhere, such as tailgates, camping sites, and boat trips. Alternatively, the user may connect the plugs after positioning the portable generator 4 within the housing 1.

The control panel 6 may require the user to input a correct security code before being able to access or change the settings of the housing 1 and/or portable generator 4. Alternatively, the control panel 6 may include a lockable case or door that may protect the control panel 6 buttons from unauthorized actuation. A fuel hook-up may also be disposed inside the housing 1 to supply gasoline, liquid petroleum, and/or natural gas (or any other fuel type) to the portable generator 4 from an external source.

The housing 1 may be configured such that that portable generator 4 may receive air from outside the housing 1 (such as for combustion air or cooling air for the engine 83 or alternator 82) and/or expel air from within the housing 1 to outside the housing 1 (such as exhaust air). In some instances, the housing 1 may merely have openings through which air is free to pass into and out of the housing 1.

In some other systems, the housing 1 may include specific components, such as passageways and channels, which may segment the interior of the housing 1 into different chambers and/or which may facilitate the transfer of air between specific components of the portable generator 4 and outside the housing 1.

Figure 5A:
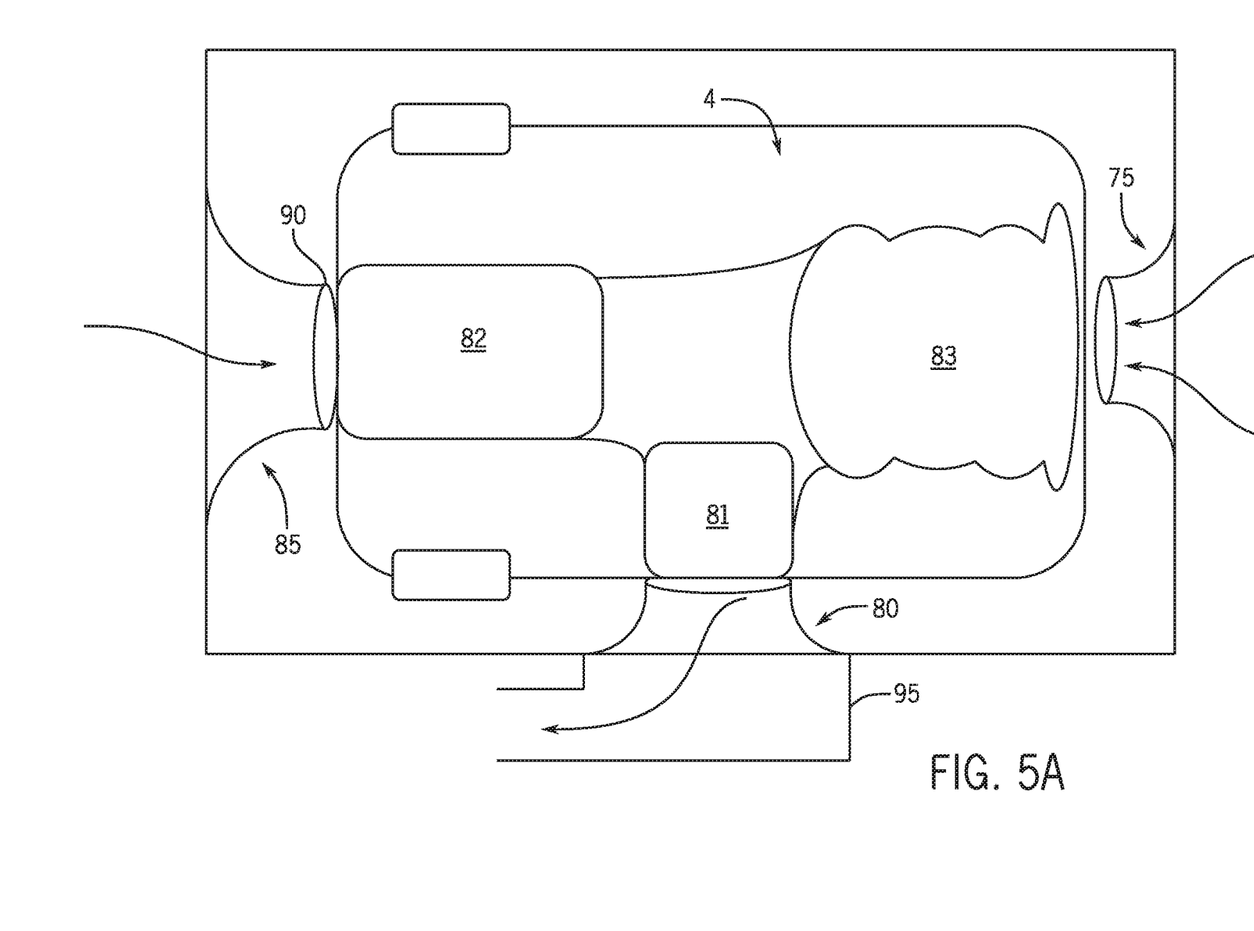
FIG. 5A shows an example intake and output arrangement of an outdoor protective housing with channels connecting to a portable generator.

FIG. 5A shows a cross-sectional top view of an example intake and output arrangement of an outdoor protective housing 1 with channels connecting to a portable generator 4. The housing 1 may include air and exhaust channels, such as an engine intake air channel 75, an exhaust output channel 80, and an alternator cooling air channel 85. The housing 1 may additionally include one or more additional channels (such as an engine cooling air channel).

The portable generator 4 may include a power generation component, which may include an engine 83. The engine 83 may be an internal combustion engine, an electric motor, a pneumatic motor, a hydraulic motor, a steam turbine, or various other engines or motors which may produce mechanical energy. The engine 83 may be powered by a fuel or resource, such as natural gas, diesel fuel, propane, gasoline, or various other fuels.

The power generation component may additionally or alternatively include an alternator 82. The alternator 82 may be an electromechanical device in communication with the engine 83. The alternator 82 may include or use a rotating magnetic field with a stationary armature, a rotating armature with a stationary magnetic field, or a linear alternator.

The power generation component may generate secondary using the engine 83, the alternator 82, or both. For example, the engine 83 may produce mechanical energy when operated. The alternator 82 may convert the mechanical energy created by the engine 83 to electrical energy, such as alternating current. The secondary power source may supply the electrical energy from the alternator 82 as secondary power. In other systems, the power generation component may include various other components and may generate electrical energy or secondary power in various other ways.

The channels 75, 80, 85 may be comprised of flexible conduits connected to the inside of the housing 1 around an opening (such as an air vent 71) in the housing 1. The channels 75, 80, 85 may be configured to connect with a portion of the portable generator 4 (such as an engine intake air port, an engine cooling air port, an exhaust port, or an alternator cooling air port), thereby sealing that portion of the portable generator 4 to the atmospheric air via the air vent 71.

The channels 75, 80, 85 may be made of stretchable material, such as rubber, flexible metals, or plastics, or combinations thereof. The channels 75, 80, 85 may be have a stretchable or deformable quality, such as being designed to be accordion folded, which may allow the conduits to be stretched to any location on a portable generator 4 where a connection is needed. The channels 75, 80, 85 may be permanently fixed and sealed air-tight to the air vents 71 of the housing 1. In other variations, the channels 75, 80, 85 may be removable and connectable to multiple air vents 71, such that the channels 75, 80, and 85 may be moved to different locations in the housing 1 to accommodate different portable generator options.

The channels 75, 80, 85 may have a loose end (opposite the end fixed and sealed to the air vents 71) which may include a securing mechanism for securing the loose end to a portion of the portable generator 4. For example, the channels 75, 80, 85 may include a magnetized seal 90 on the loose end, such that the channels 75, 80, 85 may be magnetically sealed to the portions of the portable generator 4 (such as an engine intake air port, an engine cooling air port, an exhaust port, or an alternator cooling air port). The magnetized seals 90 may be comprised of magnets arranged behind and/or distributed around a round seal made of a spongy or pliable sealing material, such as rubber, foam, or plastic. The magnets may apply a force toward the portable generator 4 thereby pressing the seal tightly against it. In other examples, the securing mechanism may include a twist-lock mechanism where the loose end may twist and lock into a mating mechanism on the portable generator 4, fasteners or snaps to lock the loose end in place, or various other securing mechanisms.

The cool air intake channel 75 may quickly connect and seal to an intake air port on an engine 83 of a portable generator 4 placed inside the housing 1. The exhaust output channel 80 may quickly connect and seal to an exhaust output after a muffler 81 of a portable generator 4 placed inside the housing 1. The alternator air channel 85 may quickly connect and seal to an air intake on an alternator 82 of the portable generator 4 placed inside the housing 1. An engine cooling air channel may quickly connect and seal to an engine cooling air port on the engine 83.

In a portable generator housing 1 made for a specific model of portable generator 4, the locations of these channels 75, 80, 85 may be fixed and able to automatically connect and seal to the portable generator 4 when placed inside the housing 1. Alternatively, these connecting channels 75, 80, 85 may be sufficiently flexible to allow for connections to any portable generator 4. Additionally, the modularity of the sides 5, 20, top 15, and bottom 10 of the housing 1 may allow for additional flexibility in the location of the channels 75, 80, 85. These and other types of internal channels for exchanging air or exhaust with the portable generator 4 may allow for the safe operation of the portable generator 4 inside the housing 1.

The exhaust directed through the exhaust output channel 80 of the portable generator housing 1 may, in some systems, be directed substantially at a right angle by an adjustable exhaust duct 95. This exhaust duct 95 may be adjusted or modified so that the exhaust from the portable generator 4 may be directed away from the side of the house or building 3. Additionally or alternatively, a connection between the secondary muffler 70 and the exhaust outlet of the portable generator 4 may be the same type as the exhaust output channel 80.

Figure 5B:
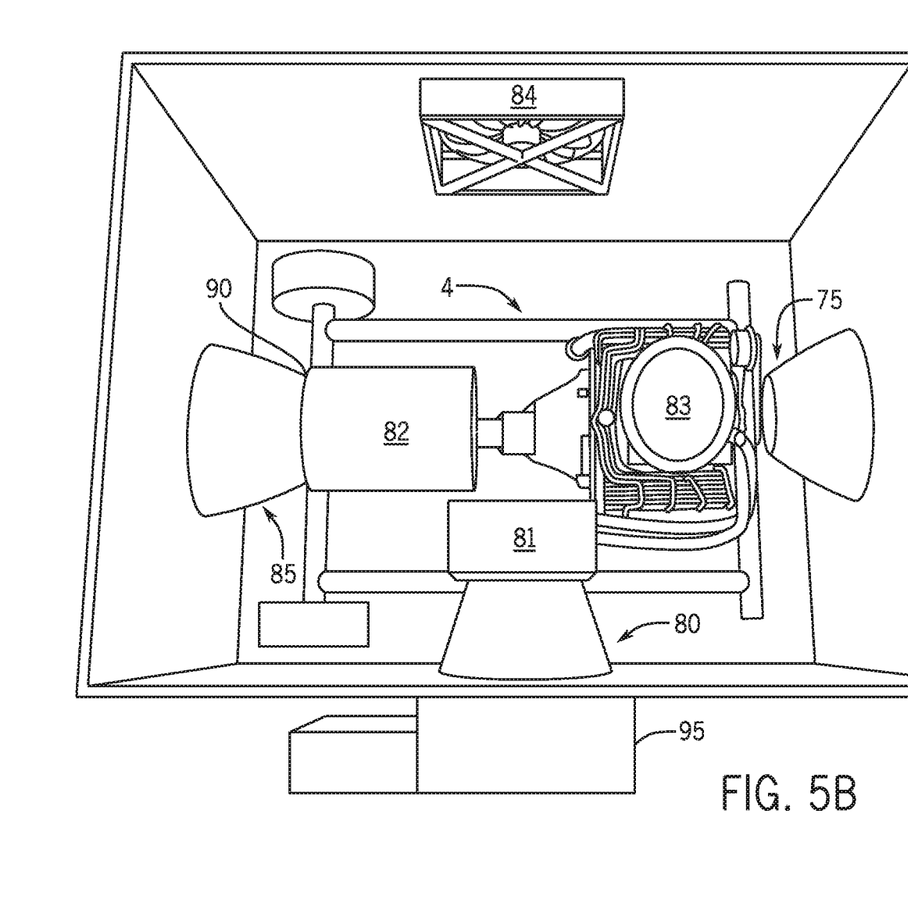
FIG. 5B shows another example intake and output arrangement of an outdoor protective housing with channels connecting to a portable generator.

As shown in FIG. 5B, some systems may include one or more exhaust fans 84. The exhaust fan 84 may be positioned directly on the portable generator 4, on a portable generator component, on the frame of the portable generator 4, and/or on the housing 1 itself. Any suitable means for positioning the exhaust fan 84 permanently or semi-permanently may be employed, for example a snap connection or a bolt-on connection. The exhaust fan 84 may be electrically connected to the portable generator 4 and/or to the housing 1. The exhaust fan 84 may be supplied power by its own battery, the portable generator 4, and/or the housing 1. In some systems, the exhaust fan 84 may be wired to be controlled by the control panel 6 of the housing 1 and/or the portable generator 4.

Figure 6:
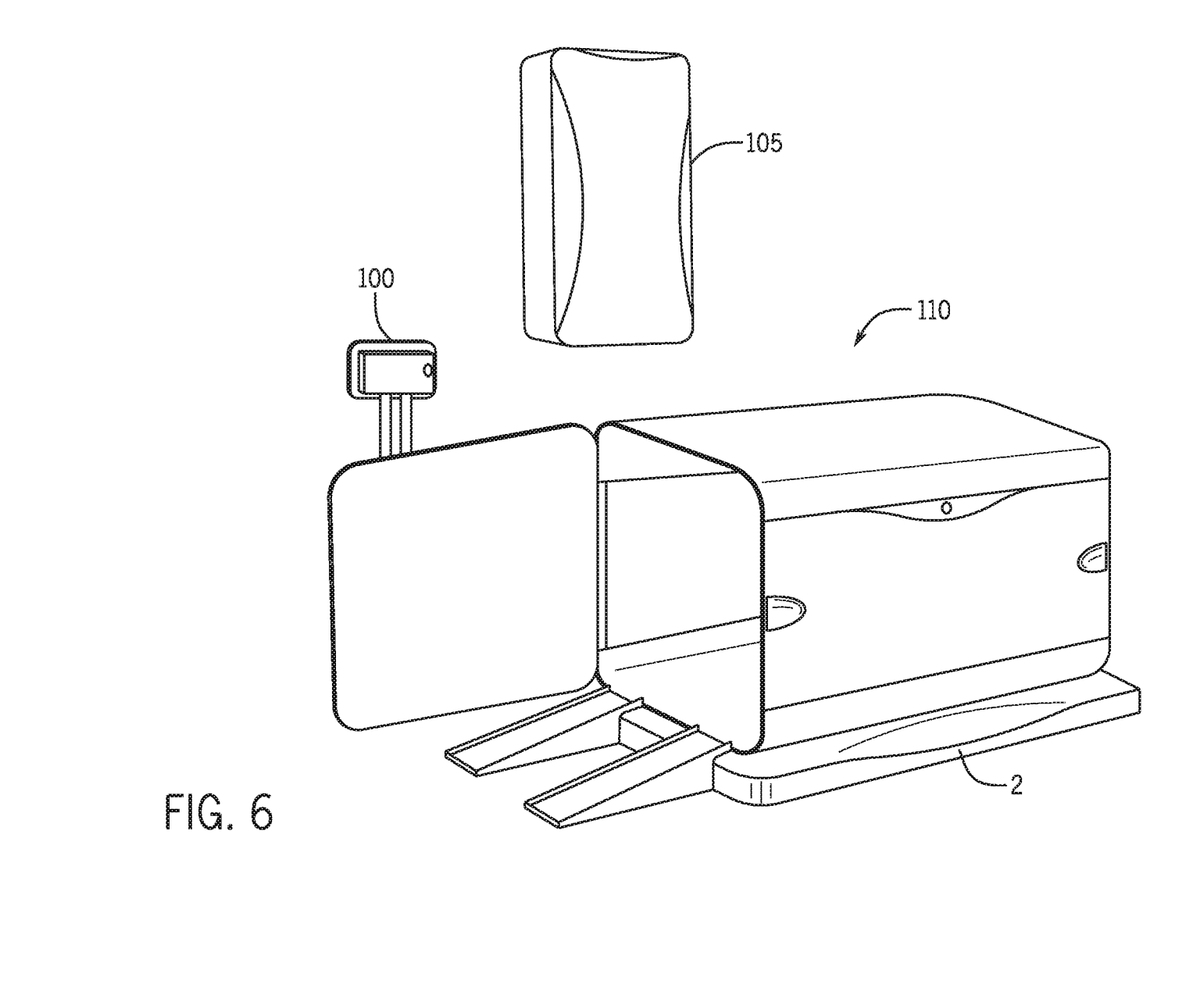
FIG. 6 shows an example portable generator storage and connection system with a housing, quick connection module, and automatic transfer switch.
Figure 7:
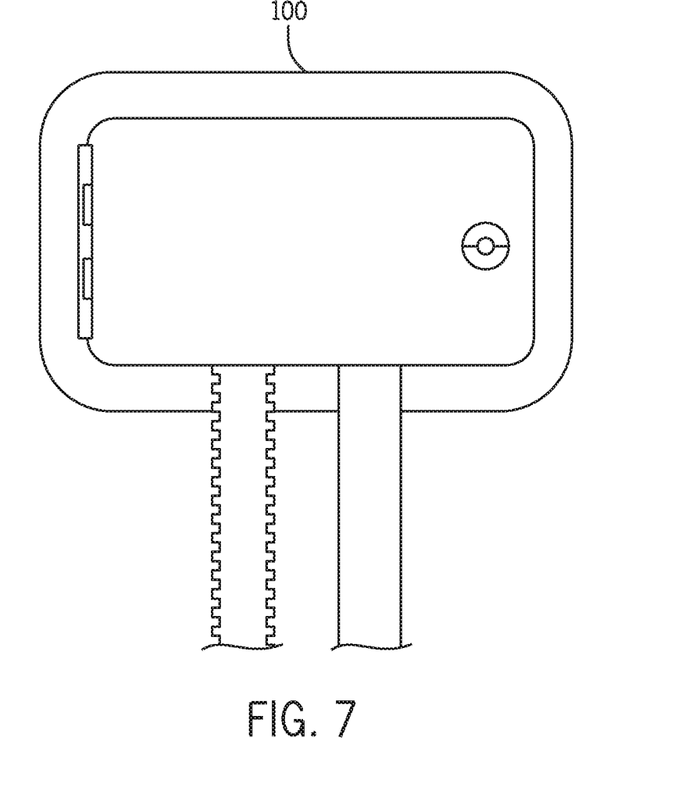
FIG. 7 shows an example quick connection module for a portable generator storage and connection system.

FIG. 6 shows an example portable generator storage and connection housing system with a housing 110, a quick connection module 100, and an automatic transfer switch 105. FIG. 7 shows an example quick connection module of the portable generator storage and connection system.

The quick connection module 100 may include quick connects for a fuel supply, for a power connection, and/or for a communications link, between the portable generator 4, control panel 6 (or receiver), housing 1, and/or the automatic transfer switch 105. Alternatively, there may be multiple quick connection modules 100, some of which may include quick connects for a fuel supply and/or others of which may include quick connects for a power connection. The fuel supply may supply liquid propane, natural gas, gasoline, and/or diesel to the portable generator 4. The power connection may transfer power from the portable generator 4 inside the housing 1 to the building 3 or any other load connected thereto. The communications link may send and/or receive communications signals between the portable generator 4 and/or the control panel 6 (or receiver on the housing 1) and the automatic transfer switch 105 and/or remote control panel 6 (or any other control device).

The automatic transfer switch 105 may be connected to a building 3, utility, or other load and the portable generator housing 1 or quick connection module 100. Using this housing system 110, the user may have auxiliary power from the portable generator 4 in its housing 1 automatically kick-on when the automatic transfer switch 105 detects a loss of power in the building 3, utility, or other load.

This system 110 may allow a user to have convenient, accessible, and safe storage for his portable generator 4 in combination with an emergency back-up system for the user's house or building 3. This may save the user in dark and stormy conditions from having to dig out and setup his portable generator 4 from the back of a garage or shed because it may be instead safely positioned in its own outdoor protective housing 1. Additionally, a service person may have easy access to the portable generator 4 and/or back-up housing system 110 for maintenance and/or upgrades without needing to access the house or building 3 itself. This system 110 may allow the user to have a back-up power system with the added functionality of being able to quickly remove the portable generator 4 from its housing 1 and bring it camping or any other event for which he may need the convenient power of a portable generator 4.

Figure 8:
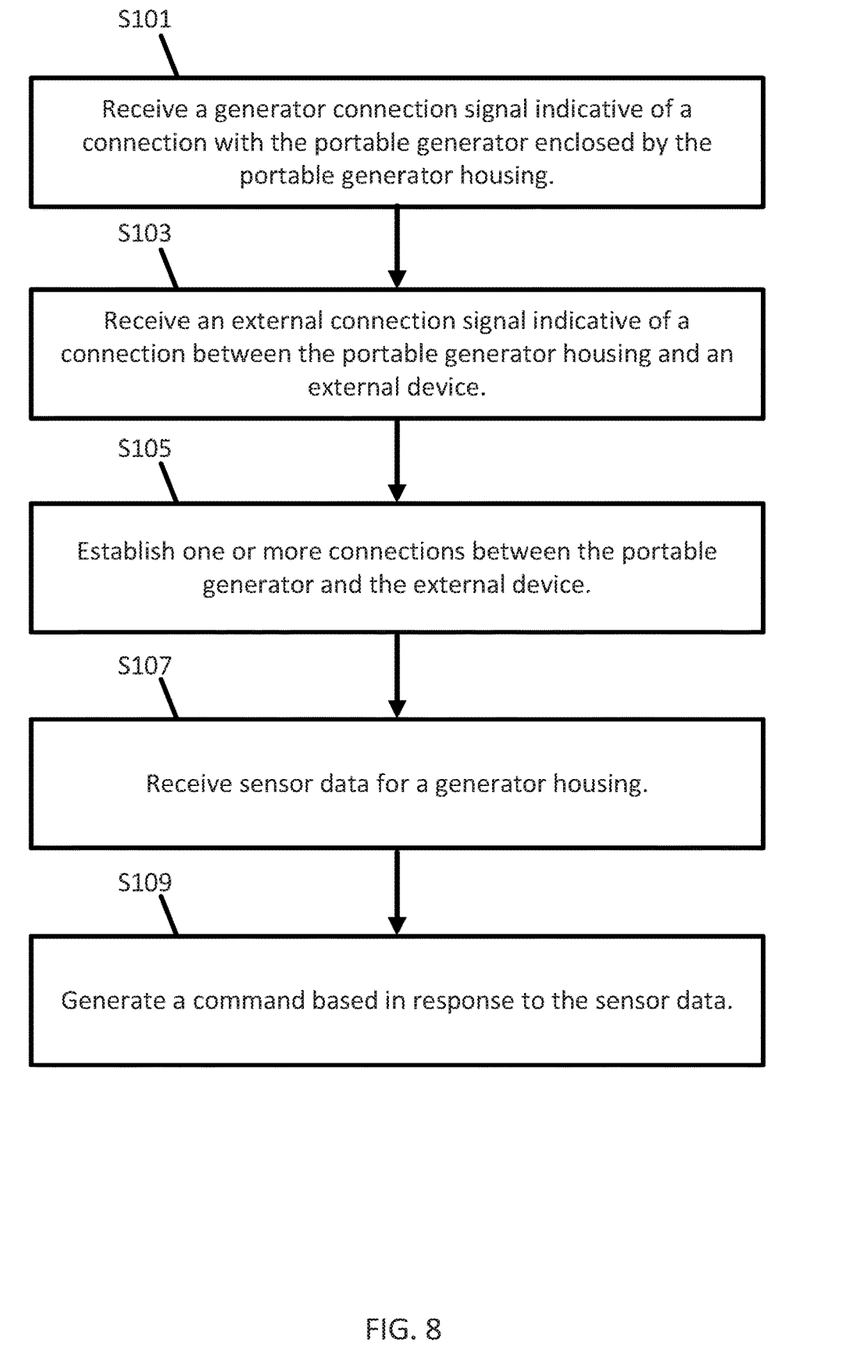
FIG. 8 illustrates an example flow chart for operation of a control panel of a portable generator housing.

FIG. 8 illustrates an example flow chart for operation of the control panel 6 of the portable generator housing. The following acts may be carried out by a controller or processor of the control panel 6. Additional, different, or fewer acts may be included.

At act S101, the controller receives a generator connection signal indicative of a connection with the portable generator enclosed by the portable generator housing. The generator connection signal may indicate that the portable generator is connected with the portable generator housing. The generator connection signal may include multiple components. One component may indicate that the fuel line of the portable generator is connected with the portable generator housing. One component may indicate that a power bus or power line of the portable generator is connected with the portable generator housing. One component may indicate that a communication interface of the portable generator is connected with the portable generator housing. The communication interface may be wired or wireless between the portable generator is connected with the portable generator housing.

At act S103, the controller receives an external signal indicative of a connection between the portable generator housing and one or more external devices. The external signal may include multiple components. One component may be indicative of a fuel supply, and the external device may include an external fuel source. One component may be a communication connection, and the external device may include a wired or wireless network in communication with the control panel 6. One component may be indicative of electrical power, and the external device may be an electrical power device such as a power bus, a power grid or an automatic transfer switch.

At act S105, the controller establishes one or more connection between the portable generator and the external device. The connection may be established in response to the generator connection signal and the external signal.

At act S107, the controller receives sensor data for the generator housing. The sensor data may include any of the examples described herein, including a light sensor, a lid sensor, a motion sensor, a heat sensor, or another sensor. In response, to the sensor data, at act S109, the controller generates a command. The command may be a generator command may start signal for the ignition of the engine. The generator command may include a kill signal to turn off the engine. The command may be a housing command. The housing command may disconnect the portable generator housing from the external device. The housing command may turn on a light or an alarm to alert a user of the portable generator housing. The command may be a user message transmitted from the control panel 6 to a communication network or a mobile device.

The methods, devices, and logic described above may be implemented in many different ways in many different combinations of hardware, software or both hardware and software. For example, all or parts of the control panel 6, user devices, serves, or generator controllers may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

The methods described may include determinations in relation to one or more thresholds. While these methods may refer to a determination about whether a parameter exceeds a threshold, the determination may in other variations be whether the parameter is greater than or equal to, less than, equal to, or less than or equal to a threshold. Other variations are possible.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A portable generator housing comprising:
   an enclosure including:
   a bottom;
   a movable top; and
   a movable side removably connected with the movable top, where the movable side is configured to move between a first position where a top edge of the movable side is adjacent to the movable top and a second position where the top edge of the movable side is in communication with a ground adjacent to the bottom.

2. The portable generator housing of claim 1, where the movable side includes a bottom edge permanently affixed to the bottom.

3. The portable generator housing of claim 2, where the movable side is configured to move between the first position and the second position by pivoting along a line formed where the bottom edge of the movable side is permanently affixed to the bottom.

4. The portable generator housing of claim 1, where in the first position, the movable side is substantially vertically oriented.

5. The portable generator housing of claim 1, where in the second position, the movable side is substantially horizontally oriented.

6. The portable generator housing of claim 1, where the movable side forms a flat or rounded ramp from the ground adjacent to the bottom.

7. The portable generator housing of claim 1, where the movable side includes at least one groove extending from the movable top edge to the bottom edge and configured to fit a wheel of a portable generator.

8. The portable generator housing of claim 1, where the enclosure is sufficiently weatherproof for a portable generator.

9. The portable generator housing of claim 1, where the bottom has grooves for guiding wheels on a portable generator when the portable generator is moved into or out of the enclosure.

10. A portable generator housing comprising:
    an enclosure configured to removably receive a portable generator, the enclosure including a bottom, a movable top, and a movable side removably connected with the movable top; and
    a quick connection module connected to the enclosure and configured to facilitate a transfer of at least one of fuel, power, or data between the quick connection module and the portable generator housing.

11. The portal generator housing of claim 10, where the enclosure is positioned adjacent to a building, wherein the quick connection module is permanently affixed to the portable generator housing and configured to facilitate a transfer of at least one of fuel, power, or data between the housing and the building.

12. A portable generator housing comprising:
    an enclosure including:
        a bottom;
        a movable top;
        a plurality of sides, wherein at least one side of the plurality of sides is movable and removably connected with the movable top, wherein the at least one side is configured to move between a first position where a top edge of the at least one side is adjacent to the movable top and a second position where the top edge of the at least one side is in communication with a ground adjacent to the bottom; and
    a control panel connected to the enclosure and configured to control the operation of a portable generator removably positioned within the enclosure.

13. The portable generator housing of claim 12, further comprising:
    a sensor that sends a signal to the control panel upon detection that the portable generator housing has been opened.

14. The portable generator housing of claim 13, where the control panel is configured to shut down the portable generator when the control panel receives the signal.

15. The portable generator housing of claim 13, where the control panel is configured to initiate an audio or visual alert when the control panel receives the signal.

16. The portable generator housing of claim 12, further comprising:
    a light positioned adjacent to an interior surface of the top, the bottom, or one of the sides, where the control panel configured to power the light when the control panel receives the signal.

17. The portable generator housing of claim 12, further comprising:
    at least one light, where the control panel is configured to control the operation of the at least one light.

18. The portable generator housing of claim 17, where the operation of the at least one light is programmed by the control panel.

19. The portable generator housing of claim 12, further comprising
    a solar panel connected to the housing and configured to provide power to a battery within the housing.

20. The portable generator housing of claim 19, where the battery is a battery for starting the portable generator.

* * * * *